(12) United States Patent
Anderson et al.

(10) Patent No.: US 11,538,597 B2
(45) Date of Patent: Dec. 27, 2022

(54) ADDITIVE MANUFACTURING OF COMPOSITE NEUTRON ABSORBING COMPONENTS

(71) Applicant: UT-Battelle, LLC, Oak Ridge, TN (US)

(72) Inventors: David C. Anderson, Knoxville, TN (US); Amelia M. Elliott, Cleveland, TN (US); Bianca Haberl, Kingston, TN (US); Garrett E. Granroth, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 285 days.

(21) Appl. No.: 16/914,974

(22) Filed: Jun. 29, 2020

(65) Prior Publication Data

US 2020/0411203 A1 Dec. 31, 2020

Related U.S. Application Data

(60) Provisional application No. 62/868,147, filed on Jun. 28, 2019.

(51) Int. Cl.
| | | |
|---|---|---|
| *G21C 11/02* | (2006.01) | |
| *B29C 64/165* | (2017.01) | |
| *B29C 64/336* | (2017.01) | |
| *B33Y 80/00* | (2015.01) | |
| *B33Y 40/20* | (2020.01) | |
| *B33Y 10/00* | (2015.01) | |
| *B29C 64/35* | (2017.01) | |

(52) U.S. Cl.
CPC .......... *G21C 11/028* (2013.01); *B29C 64/165* (2017.08); *B29C 64/336* (2017.08); *B29C 64/35* (2017.08); *B33Y 10/00* (2014.12); *B33Y 40/20* (2020.01); *B33Y 80/00* (2014.12)

(58) Field of Classification Search
CPC ..... B29C 64/336; B29C 64/165; B33Y 10/00; B33Y 80/00; B33Y 40/00; B33Y 40/02; G21K 1/02; G21K 1/046; G21C 11/02; G21C 11/026; G21C 11/028; G21F 1/00–125
See application file for complete search history.

(56) References Cited

U.S. PATENT DOCUMENTS

| | | | |
|---|---|---|---|
| 2018/0126515 A1* | 5/2018 | Franke | ................ C22C 32/0031 |
| 2019/0108923 A1 | 4/2019 | Anderson et al. | |
| 2020/0269318 A1 | 8/2020 | Cramer et al. | |

OTHER PUBLICATIONS

Olsson, A. et al., "Boron carbide composite apertures for small-angle neutron scattering made by three-dimensional printing", Journal of Applied Crystallography (2016), 49, pp. 696-699.

* cited by examiner

*Primary Examiner* — Mary Lynn F Theisen
(74) *Attorney, Agent, or Firm* — Warner Norcross + Judd LLP (57) ABSTRACT

Collimators and other components for use in neutron scattering experiments or to provide neutron shielding in nuclear reactors or accelerator based neutron sources are produced by additive manufacturing from multiple different types of material, such as boron carbide ($B_4C$), steel, isotopically enriched boron carbide ($^{10}B_4C$), and blends thereof.

27 Claims, 7 Drawing Sheets

ADDITIVE MANUFACTURING OF COMPOSITE NEUTRON ABSORBING COMPONENTS

CROSS-REFERENCE TO RELATED APPLICATION

This application claims the benefit of U.S. Provisional Application No. 62/868,147 filed Jun. 28, 2019. The disclosure of this patent application is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

TECHNICAL FIELD

The present invention relates to manufacture of components from neutron absorbing materials using additive manufacturing.

BACKGROUND OF THE INVENTION

One way to improve the performance of a neutron scattering instrument is to improve its signal to noise ratio by background reduction. Background reduction refers to reducing or eliminating neutrons coming from sources other than the sample being investigated. Background reduction of neutron scattering instruments is often accomplished by collimation.

Neutron instruments and sources, including nuclear reactors and accelerator based spallation neutron sources, can include biological shielding from both gamma and neutron radiation to protect people and the environment. Background reduction and neutron shielding for thermal neutrons is often accomplished by use of neutron absorbing materials like boron, cadmium, lithium, and gadolinium. The forms in which these materials are available are frequently limiting with respect to the ways they can be used to shield neutrons. For example, boron is commonly used in nuclear reactors and neutron scattering instruments in the form of boron carbide ($B_4C$), which is a ceramic. Boron carbide is typically available in plates, but can also be mixed with an epoxy and be cast (resulting in a greatly reduced percentage of boron carbide by volume), or can be formed or cast into simple shapes as a "green" part and sintered. The cost of boron carbide plates is high, the manufacturing time is long, the possible shapes are not large nor give much geometric flexibility, and parts or often broken during intended use on the beamlines. If the parts do not fit (because of a design or manufacturing error), they are very difficult and sometimes impossible to modify. If the parts cannot be used because of a fit problem or because they are broken, the cost remains high but no benefit in signal to noise ratio is realized.

Neutron collimators are a common way to reduce background for neutron scattering experiments at thermal and cold neutron sources. Collimation can be achieved with simple collimator geometry that places an aperture or pinhole made of neutron absorbing materials incident with the neutron beam, or by placing multiple apertures of different sizes at different locations incident the neutron beam. Collimator geometry can also be more complex, such as in the cases of Söller, radial, or conical collimators. Often Stiller slit collimators are used to provide neutron collimation without overly sacrificing neutron flux. One method for manufacturing a Stiller neutron scattering collimator is to stretch sheets of bi-axially oriented polyethylene terephthalate, also known as Mylar, or another film between opposite sides of a structural frame. The film is then coated with a neutron absorbing material like boron carbide or gadolinium oxide ($Gd_2O_3$). This technique limits the geometry of a neutron scattering collimator to horizontally or vertically parallel blades, or blades that have an angular divergence in one plane (e.g., a radial collimator). Mylar is a hydrocarbon containing plastic material $((C_{10}H_8O_4)_n)$. Because hydrogen has a large incoherent cross section for neutron scattering, it has the potential to increase unwanted background and decrease the effectiveness of the collimator. Simple blades of cadmium or gadolinium metal can also be used for the collimating medium. These blades have a greater thickness than the Mylar films and they tend to bend with use, further decreasing their transmission of the neutron beam.

Although multiple apertures placed at different locations along an incident neutron beam may be made from different materials, due to manufacturing limitations, all other types of collimation are practically always made from a single material.

Neutron absorbing materials are also frequently used in other kinds of shielding such as beam defining apertures, masks, and large area background reducing/biological shielding barriers. Typically, material for these types of applications are available in sheets. For example, boron carbide plates, cadmium sheets, and borated polyethylene sheets are all available commercially. Cadmium sheets can be bent or rolled, and have basically the same manufacturing limitations as any sheet metal, but also have industrial hygiene issues because they are a carcinogen. Boron carbide plates and borated polyethylene sheets can be applied as flat panels, but making curved shapes, or more complex shapes is difficult to impossible depending on the application. In addition, the hydrogen content of borated polyethylene makes it unsuitable for use near the direct neutron beam of neutron scattering instruments.

There has been some exploration of additive manufacturing of a boron carbide polymer blend using fused deposition modeling (FDM). See Anders Olsson & Adrian R. Rennie, *Boron carbide composite apertures for small-angle neutron scattering made by three-dimensional printing*, J. Appl. Cryst. 696 (2016). Olsson and Rennie describe preparing a 60% (by weight) $B_4C$/Acrylonitrile Butadiene Styrene (ABS) composite filament and also a 30% (by weight) $^{10}B_4C$/ABS composite filament. The filaments are prepared by dissolving ABS pellets in acetone, then mixing $B_4C$ or $^{10}B_4C$ before extruding filament on a Filastruder, which is then used to 3D print apertures using an Ultimaker 2 FDM printer.

Further, systems and methods for additively manufacturing neutron collimators and other components for use in neutron scattering experiments or to provide neutron shielding in nuclear reactors or accelerator based neutron sources are disclosed in U.S. application Ser. No. 16/155,134 to David C. Anderson et al., filed on Oct. 9, 2018, entitled METHOD FOR PRODUCING COLLIMATORS AND OTHER COMPONENTS FROM NEUTRON ABSORBING MATERIALS USING ADDITIVE MANUFACTURING, which is hereby incorporated by reference in its entirety. These systems and methods describe additive manufacturing neutron collimators from neutron absorbing material, such as boron carbide ($B_4C$) or isotopically enriched boron carbide ($^{10}B_4C$). The utilization of additive manufacturing enables production of components with complex geometry that would be unmanufacturable through standard manufacturing processes, e.g., impossible or cost prohibitive to machine, cast, or wire electrical discharge machine (EDM) cut.

SUMMARY OF THE INVENTION

The present invention is generally directed to a system and method for additively manufacturing a single piece collimator from two or more different materials. Neutron collimators and other neutron absorbing devices are typically made from a single material due to limitations in manufacturing processes. Additive manufacturing methods in accordance with the present disclosure can produce a composite neutron absorbing component or part from two or more different materials. By selecting and adjusting the type and amounts of material, characteristics of the composite neutron absorption component can be controlled, set, and adjusted. For example, cost, toughness, strength, and a number of other characteristics can be influenced by changes in the types of different materials and amounts of different material that are utilized in the composite part. That is, the types of materials and/or ratios of different materials in the component can be changed to adjust the characteristics of the component as desired. Further, because the process utilizes an additive manufacturing, complex geometry and other geometric optimizations can also be achieved.

Although one aspect is generally directed to additive manufacture of a neutron collimator, the system and method is not limited as such and is suitable for additive manufacture of a variety of other neutron absorbing components that are useful in different applications. For example, some neutron absorbing components are used in scientific and medical imaging applications.

In general, one innovative aspect of the subject matter described in this specification can be embodied in a method of additively manufacturing composite neutron absorbing components with a binder jet printer. The method includes repeatedly dispensing a first powder into layers to form a first portion of a powder bed on a build platform, repeatedly and selectively binding the layers of the first powder with binder to produce a first portion of the composite neutron absorbing component in the powder bed on the build platform, repeatedly dispensing a second powder into layers to form a second portion of a powder bed on a build platform, repeatedly and selectively binding the layers of the second powder with binder to produce a second portion of the composite neutron absorbing component in the powder bed on the build platform, curing the composite neutron absorbing component, and de-powdering the composite neutron absorbing component from the powder bed as a single composite neutron absorbing component with distinct portions made from different materials.

The foregoing and other embodiments can each optionally include one or more of the following features, alone or in combination. In particular, one embodiment includes all the following features in combination.

In some embodiments, the additively manufactured neutron absorbing component can be a neutron absorbing collimator where its tip is made from a different material than its base.

In some embodiments, the first powder is natural Boron Carbide and the second powder is enriched Boron Carbide. Binder can be deposited on the different layers of powder in order to bind and form the composite component.

In some embodiments, three, four, or more types of material are formed into the composite component. The method can include repeatedly dispensing a third powder into layers to form a third portion of a powder bed on a build platform and repeatedly and selectively binding the layers of the third powder with binder to produce a third portion of the composite neutron absorbing component in the powder bed on the build platform. The first powder and third powder can be different neutron absorbing powders and the second powder can be a neutron non-transparent powder.

The method can include special loading techniques to improve transitions between layers in the final composite part according to desired characteristics. In some embodiments, a full load method can be used where a first powder is loaded onto a powder supply platform and a second powder is loaded on top thereby forming a transition area between that blends from one to the other. In some embodiments, a pause and replace or pause and load method can be used where a first powder is loaded, layers printed, and then the printer is paused and the powder is replaced with a new powder to provide precise-non-blended transitions from the first powder to the second powder. In some embodiments, a hybrid approach provides loading a first powder onto the supply feed, and pausing the printing to replace the first powder with a blend between that powder and the next powder, printing a few layers with the blend, pausing, and replacing the blend with a purse version of the second powder. This hybrid approach provides benefits of the full load method and the pause and load methods by providing a controlled transition from layers of the first powder to layers of the second powder. Multiple transition areas can be created where more than two layers are utilized.

In general, another innovative aspect of the subject matter described in this specification can be embodied in a method of additively manufacturing a composite neutron absorbing component. The method includes loading a plurality of different types of powder into a powder feed supply of a binder jet printer. Therein at least one of the plurality of different types of powders is a neutron absorbing powder having neutron absorbing characteristics, positioning a build platform of the binder jet printer, dispensing a portion of the plurality of different types of powder from the powder feed supply into a layer on the build platform, selectively depositing binder with a movable binder jet print head on the layer of powder on the build platform, repeating the positioning the build platform of the binder jet printer, the dispensing the powder from the powder feed supply into a layer on the build platform, and the selectively depositing binder with the movable binder jet print head on the layer of powder on the build platform to binder jet print a composite neutron absorbing component in a powder bed on the build platform, and de-powdering the composite neutron absorbing component from the powder bed.

The foregoing and other embodiments can each optionally include one or more of the following features, alone or in combination. In particular, one embodiment includes all the following features in combination.

In some embodiments, the composite neutron absorbing component is a composite neutron absorbing collimator where the tip is additively manufactured from a different material than the base.

In some embodiments, the first powder and third powder are different neutron absorbing powders and the second powder is a neutron non-transparent powder.

In some embodiments, the loading includes loading the plurality of different types of powder onto the powder feed supply of the binder jet printer in layers, one on top of the next, forming transition areas between adjacent layers on the powder supply platform, where the adjacent different types of powder blend from one to the other in the transition areas.

In some embodiments, the loading includes loading the plurality of different types of powder into the powder feed supply one material at a time, pausing the binder jet printer after each type of material is transported to the build platform, removing any remainder material in the powder feed supply and loading a different material into the powder feed supply to be dispensed from the powder feed supply to into a layer on the build platform to provide precise-non-blended transitions from one powder layer to the next.

In some embodiments, the method includes loading a first powder into a powder feed supply, printing a plurality of layers with the first powder, pausing the printing, removing any remaining first powder from the powder feed supply while paused, loading a blend between the first powder and the second powder into the powder feed supply while paused, resuming the printing including printing one or more layers with the blended powder, pausing the printing again, removing any remaining blend powder from the powder feed supply while paused, loading the second powder into the powder feed supply while paused, and resuming printing including printing a plurality of layers with the second powder to provide a controlled transition from printing layers of the first powder to layers of the second powder.

In some embodiments, the method includes where loading is configured according to a pause and replace method, a full load method, or a hybrid combination thereof.

In general, another innovative aspect of the subject matter described in this specification can be embodied in an additively manufactured one-piece composite neutron absorbing component. The component includes a first contiguous portion of material additively manufactured from a first type of neutron absorbing powder having a first set of neutron absorbing characteristics, a second contiguous portion of material, joined to the first contiguous portion of material, additively manufactured from a second, different, material having a second set of neutron absorbing characteristics, different from the first set of neutron absorbing characteristics.

The foregoing and other embodiments can each optionally include one or more of the following features, alone or in combination. In particular, one embodiment includes all the following features in combination.

In some embodiments, the first contiguous portion and second contiguous portion are sized, shaped, and positioned for use as a neutron collimator in a neutron pressure cell, the first contiguous portion forming a neutron collimator tip and the second contiguous portion forming a neutron collimator base. In some embodiments, the first contiguous portion and second contiguous portion constructed for use as a neutron absorbing device.

In some embodiments, neutron absorbing materials may be combined with gamma radiation absorbing materials (like Lead or Steel) in such a way as to shield a gamma radiation sensitive neutron detector or to provide biological shielding. Such embodiments can be suitable for a component in a neutron scattering application that emits gamma radiation because of interaction with neutrons, to protect from a beam that has a mixed source of neutron and gamma radiation, to reduce gammas from the neutron absorbing constituents in the embodiment itself, or is easily damaged by gamma radiation such as spectrometers for multimodal optical measurements, to name a few exemplary use cases.

In some embodiments, the first contiguous portion of material is additively manufactured from a first type of neutron absorbing powder having a first set of characteristics and the second contiguous portion is additively manufactured from a second type of neutron absorbing powder having a second set of characteristics, wherein the first and second neutron absorbing powder and their characteristics are different from each other.

In some embodiments, the first contiguous portion of material is selected to enhance a characteristic of the first portion and wherein the second contiguous portion of material is selected to enhance a characteristic of the second portion, wherein the characteristic of the first portion and the characteristic of the second portion are different characteristics.

In some embodiments, the characteristic of the first portion and the characteristic of the second portion are selected from the group comprising neutron absorption, cost, toughness, and strength.

In some embodiments, a third contiguous portion of material is included, joined to the first and second contiguous portions of material and wherein the first contiguous portion and second contiguous portion are joined to each other indirectly through the third contiguous portion of material, wherein the third contiguous portion of material is additively manufactured from a third material that is a neutron non-transparent material. The third contiguous portion of material can be tube shaped having two ends, the first contiguous portion of material includes a beam defining aperture at one end of the tube, and the second contiguous portion of material includes a beam defining aperture at the other end of the tube, wherein the beam defining aperture of the first contiguous portion of material is larger than the beam defining aperture of the second contiguous portion of material.

In some embodiments, the first contiguous portion of material is natural Boron Carbide, the second contiguous portion of material is enriched Boron Carbide, and the third contiguous portion of material is steel.

In some embodiments, a third contiguous portion of material can be joined to the first and second contiguous portions of material, where the first contiguous portion and second contiguous portion are joined to each other indirectly through the third contiguous portion of material, wherein the third contiguous portion of material is additively manufactured from a blend of the first neutron absorbing powder and the second neutron absorbing powder.

The additive manufacturing method and additive manufacture are particularly suited for producing neutron absorbing components that strike a balance between cost and performance. The method of manufacture provides a simple and effective method to additively manufacture a neutron absorbing component that allows components to be printed from multiple different types of material. The ability to print collimators and other components with different components provides the ability to select, control, or otherwise optimize the collimator characteristics and cost by carefully selecting the different types of materials used in the component. Further, the ability to control the type of transition, either a precise transition with a clean switch from one material to the next or a gradual blending from one material to the next can be a useful tool to influence the properties of the collimator, either at the specific local area of the transition, or of the overall collimator.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

DESCRIPTION OF THE CURRENT EMBODIMENT

Neutron absorbing components such as neutron absorbing collimators can be additively manufactured in various shapes, sizes, and configurations. The present disclosure relates to additively manufacturing composite neutron absorbing components made from multiple materials. By additively manufacturing a composite neutron absorbing component, different portions can be manufactured using different materials that are specifically suited to the function provided by that portion of the component. Two examples of additively manufactured composite neutron absorbing components are illustrated in FIGS. 3-4 and FIG. 8, respectively.

One factor in the performance characteristics of a neutron absorbing collimator is the material of the collimator. For example, a neutron absorbing collimator may be more effective if it is made from enriched Boron Carbide ($^{10}B_4C$) as opposed to natural Boron Carbide ($B_4C$). However, enriched Boron Carbide is currently about sixty times more expensive than natural Boron Carbide. Neutron collimators and other neutron absorbing components (e.g., parts, devices, and apparatuses) are typically made from a single composite material or single pure material, due to limitations in manufacturing processes. That is, often neutron absorbing devices were constructed from a single type of material not because that material provides the appropriate characteristics for all portions of the component, but rather because it was not feasible to manufacture just certain portions of a component from one material and other portions of the component from another material. The additive manufacturing methods described in this disclosure enable production of a single composite part from two or more different materials, which themselves may be composite or pure materials. This provides the capability to optimize or select characteristics for a particular portion of the device relating to one or more of neutron absorption, cost, toughness, strength, or other characteristics, or any combinations thereof. Further, because an additive manufacturing process is utilizing to construct the neutron absorbing component, complex geometry and other geometric optimizations can also be achieved.

Figure 8:
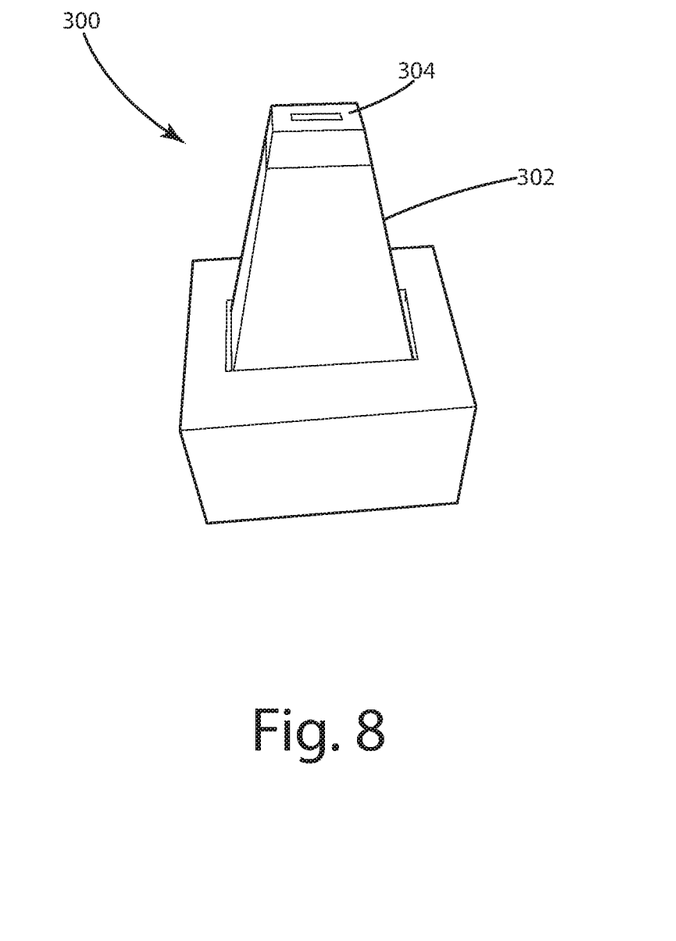
FIG. 8 illustrates a perspective view of one embodiment of a composite neutron absorbing collimator for neutron pressure cell.

Referring to FIG. 8, one example of an additively manufactured composite neutron absorbing collimator 300 for a neutron pressure cell is illustrated. In the depicted embodiment, the base portion 302 of the collimator is additively manufactured from a first material, and the tip portion 304 is additively manufactured from a different, second, material. Similar collimator performance to that of a fully enriched Boron Carbide pressure cell collimator can be achieved by additively manufacturing a composite version that is made only partially from fully enriched Boron Carbide, such as illustrated in FIG. 8. For example, the neutron absorbing material at the tip 304 of the collimator 300 can have a disproportionate effect on the properties of the collimator relative to the neutron absorbing material used in the base 302 of the collimator. FIG. 8 depicts an additively manufactured composite collimator in which only the tip 304 of the collimator 300 is made from a more expensive, higher performing enriched Boron Carbide ($^{10}B_4C$) material while the base 302 is made from the less expensive, natural Boron Carbide ($B_4C$).

Figure 3:
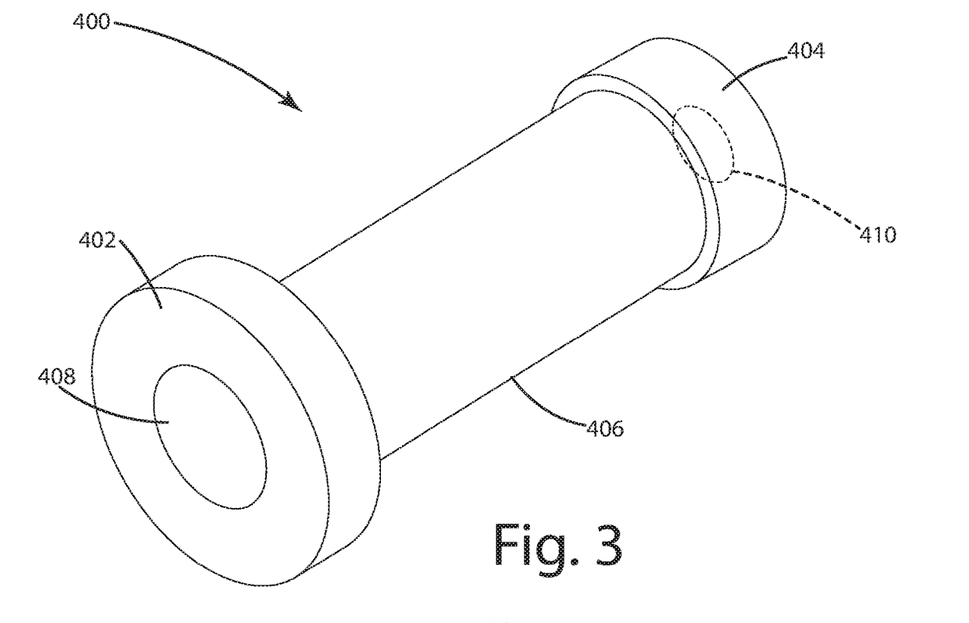
FIG. 3 illustrates a perspective view of one embodiment of a composite neutron absorbing collimator additively manufactured according to one embodiment of a method of the present disclosure.
Figure 4:
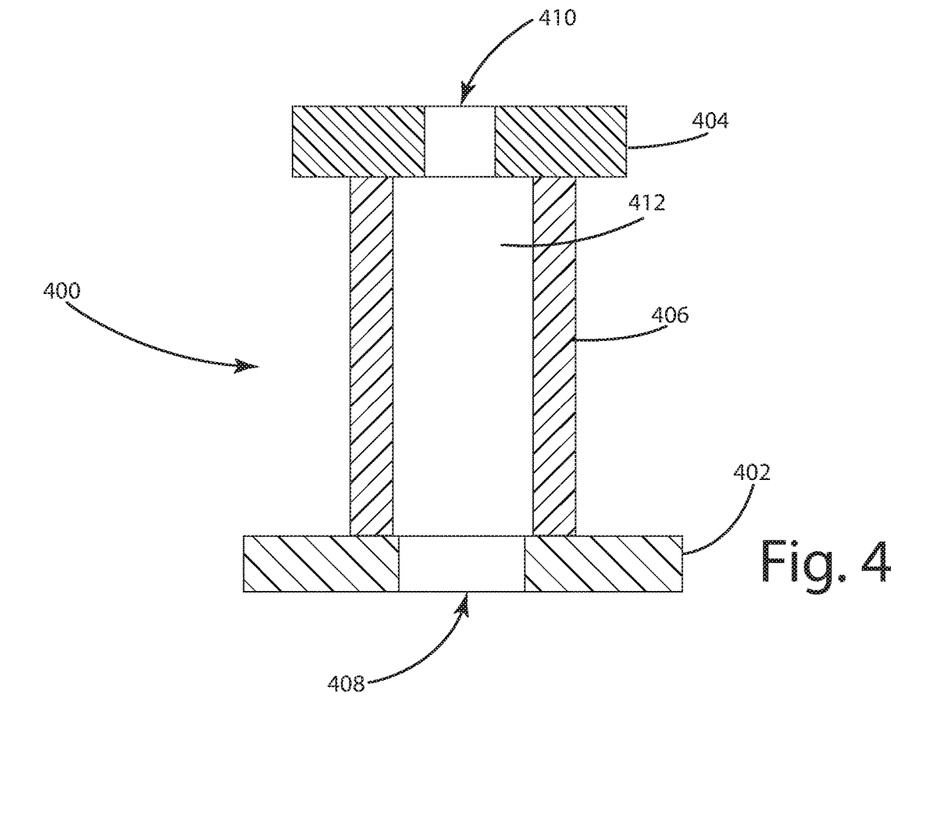
FIG. 4 illustrates a sectional view of the composite neutron absorbing collimator of FIG. 3.

Referring to FIGS. 3-4, another example of an additively manufactured composite neutron absorbing collimator 400 is illustrated. This collimator 400 includes an aperture 408 defined by natural Boron Carbide ($B_4C$) material 402 at the upstream end of a tube 406 made from a neutron non-transparent material, such as steel, that defines an opening 412 with a second, smaller aperture 410 at the downstream end, defined by enriched Boron Carbide ($^{10}B_4C$) material 404. The opening 412 of the tube 406 connects the two apertures 408, 410. The shape and other characteristics of the collimator, including the size and shapes of the apertures 408, 410 and tube opening 412 can vary depending on the application, for example, to define particular beam characteristics for the collimator. In the depicted embodiment, the apertures and tube opening are coaxial. In other embodiments, the opening between the apertures may be tapered, for example in a cone-like shape from the larger diameter aperture to the lower diameter aperture. In some embodiments, a composite conical collimator with internal blades can be additively manufactured in accordance with the present disclosure. In the illustrative example of FIGS. 3-4, the collimator has suitable neutron absorbing properties, where beam defining apertures 408, 410 and opening 412 operate satisfactorily as a neutron absorbing collimator. The performance of the neutron absorbing component can be increased by using material that has more desirable collimation characteristics, such as enriched Boron Carbide ($^{10}B_4C$). However, enriched Boron Carbide ($^{10}B_4C$) can be significantly more expensive than some alternatives. For example, natural Boron Carbide ($B_4C$) is about sixty times less expensive. The expense of the neutron absorbing material can be reduced by using less expensive material, such as natural Boron Carbide ($B_4C$), at one end of the collimator to define the larger opening 408 and limiting the more expensive neutron absorbing material, such as enriched Boron Carbide ($^{10}B_4C$), to defining the smaller aperture 410 at the opposite end of the collimator. A collimator produced in this manner can have the benefit of neutron absorbing, beam defining apertures at either end of the collimator, minimizing the amount of expensive neutron absorbing material by using it only at the smaller end, while also using a less expensive neutron non-absorbing, but also neutron non-transparent material for the bulk of the volume to achieve the desired geometry of the part. Other versions of this concept can include additional sections printed from four or more different materials. In yet another embodiment, all but the tip of the collimator can be created from a mixing of natural Boron and enriched Boron Carbide ($^{10}B_4C$) with enriched Boron Carbide ($^{10}B_4C$) being used for the final aperture of the collimator.

Relevant collimator properties can be defined, at least in part, by the neutron absorbing materials that define the collimator apertures. The material making up the remaining portions of the collimator may or may not constructed from neutron absorbing materials. The remaining portions can be constructed from a material that does not substantially hinder desired collimator properties, such as the neutron beam definition. In some embodiments, the remaining portions are constructed from a material that can assist one or more collimator properties, such as defining the neutron beam. For example, the bulk of the geometry of the collimator can be additively manufactured with a less expensive, neutron non-transparent material, such as steel. That is, tube 406 can be constructed from a material that is substantially opaque to neutrons, such as steel. In certain embodiments, the bulk of the geometry of the collimator can be constructed from neutron non-absorbing material. The material can also be partially or fully neutron reflective.

Although exemplary neutron collimator 400 is illustrated with three portions made from different materials: a first ring portion 402 made from natural Boron Carbide ($B_4C$), a second tube portion 406 made from steel, and a third ring portion 404 made from enriched Boron Carbide ($^{10}B_4C$), alternative embodiments can include additional, fewer, or different portions made from the same three materials or from additional, fewer, or different materials. For example, a collimator can be manufactured according to one of the methods of the present disclosure that includes sections that are 3D printed from four or more different materials. Further, as discussed in more detail later, a collimator manufactured in accordance with one of the methods of the present disclosure may include not only multiple sections, each constructed from a different material, but may also include sections constructed from material blends or composites, even blends or composites of materials used in other portions of the collimator. Further, although the exemplary collimator of FIGS. 3-4 includes a tube 406 with rings 402, 404 at the ends, in alternative embodiments the different portions of the collimator can have different shapes and sizes.

In general, the additive manufacturing processes of the present disclosure involve layering multiple materials, including at least one neutron absorbing material, to additively manufacture a composite neutron absorbing component using an additive manufacturing printer. Various embodiments of the additive manufacturing process of the present disclosure will now be described in detail.

In many embodiments, the additive manufacturing process includes layering multiple powder materials, including at least one neutron absorbing powder material, to additively manufacture a composite neutron absorbing component using an additive manufacturing printer, such as a binder jet 3D printer or other type of additive manufacturing printer capable of additively manufacturing a component from powder material. In some embodiments, the additive manufacturing process includes layering one or more neutron absorbing powders and one or more neutron non-transparent powders to additively manufacture a composite neutron absorbing component using an additive manufacturing printer. Once the components have been fully printed, they can be de-powdered to produce a functional composite neutron absorbing component, such as a composite neutron collimator. The neutron absorbing components can also be cured and infiltrated with an additive to strengthen the components, for example, as described in U.S. application Ser. No. 16/155,134 to David C. Anderson et al., dated Oct. 9, 2018, entitled METHOD FOR PRODUCING COLLIMATORS AND OTHER COMPONENTS FROM NEUTRON ABSORBING MATERIALS USING ADDITIVE MANUFACTURING, which was previously incorporated by reference in its entirety.

One example of a composite neutron absorbing component that can be produced according to various embodiments of the present disclosure is a composite neutron absorbing collimator. Before turning to the specific steps of an example of an additive manufacturing process in accordance with the present disclosure, it should be understood that a composite collimator in accordance with the present disclosure can be directly printed from a plurality of different neutron absorbing powders, such as natural Boron Carbide ($B_4C$), enriched Boron Carbide ($^{10}B_4C$), and essentially any of other neutron absorbing powder capable of additive manufacture. These neutron absorbing powders are used directly in the additive manufacturing process. While coatings and other post processing techniques are not precluded from being used in conjunction with the processes and resultant components of the present disclosure, the neutron absorbing powders described in connection with this process form the additively manufactured component and are not merely applied as a coating to an additively manufactured substrate.

Binder jet additive manufacturing is a specific type of additive manufacturing utilized in connection with some embodiments of the present disclosure. For example, the neutron absorbing components depicted and described in connection with FIGS. 3-4 and FIG. 8 can be additively manufactured with a binder jet printer according to the present disclosure. One embodiment of the process of the present disclosure will now be described in connection with FIGS. 1-2, which provide an overview and context for binder jet printing and FIGS. 5-7, which detail an exemplary binder jet printing process at three different stages of the additive manufacture process.

Figure 1:
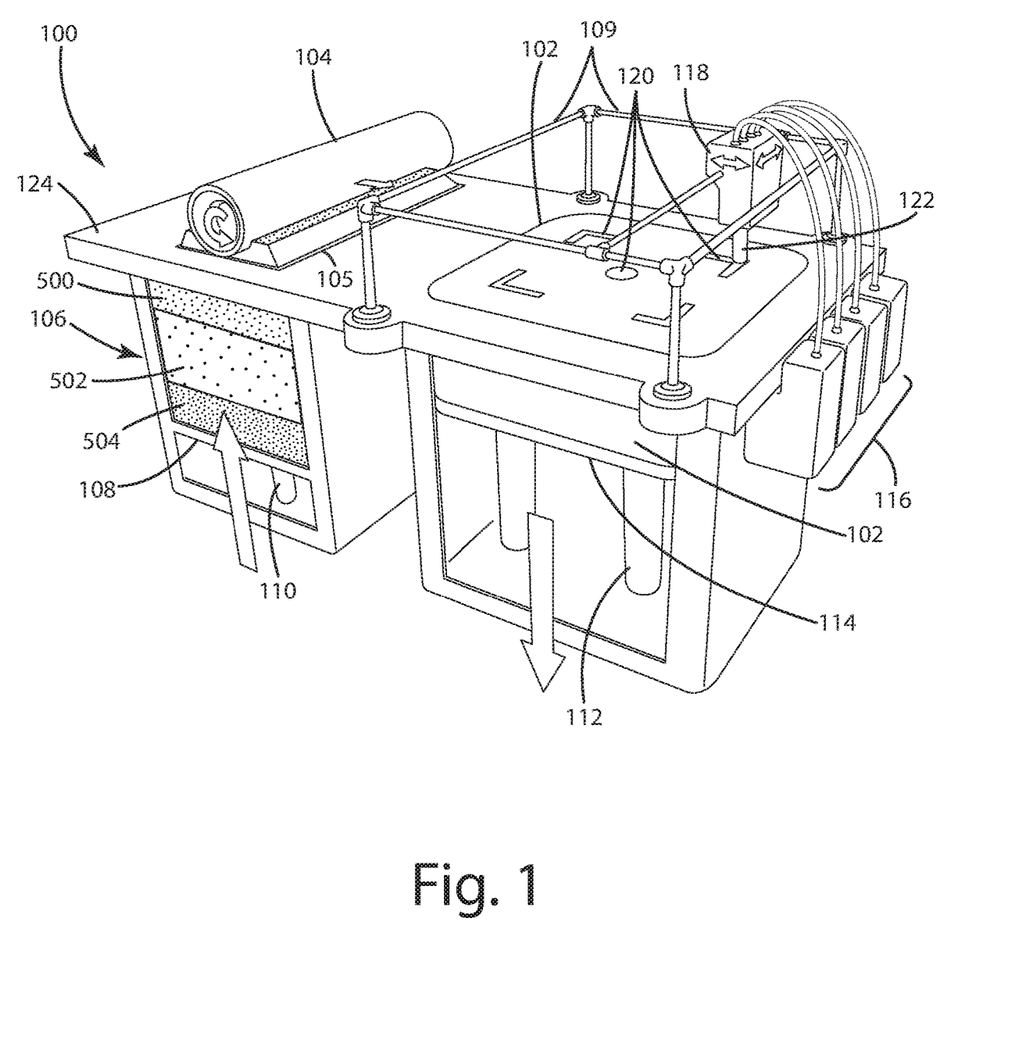
FIG. 1 is a representative perspective view of a binder jet additive manufacturing printer for use in additively manufacturing a neutron absorbing component from multiple different materials including neutron absorbing material.
Figure 2:
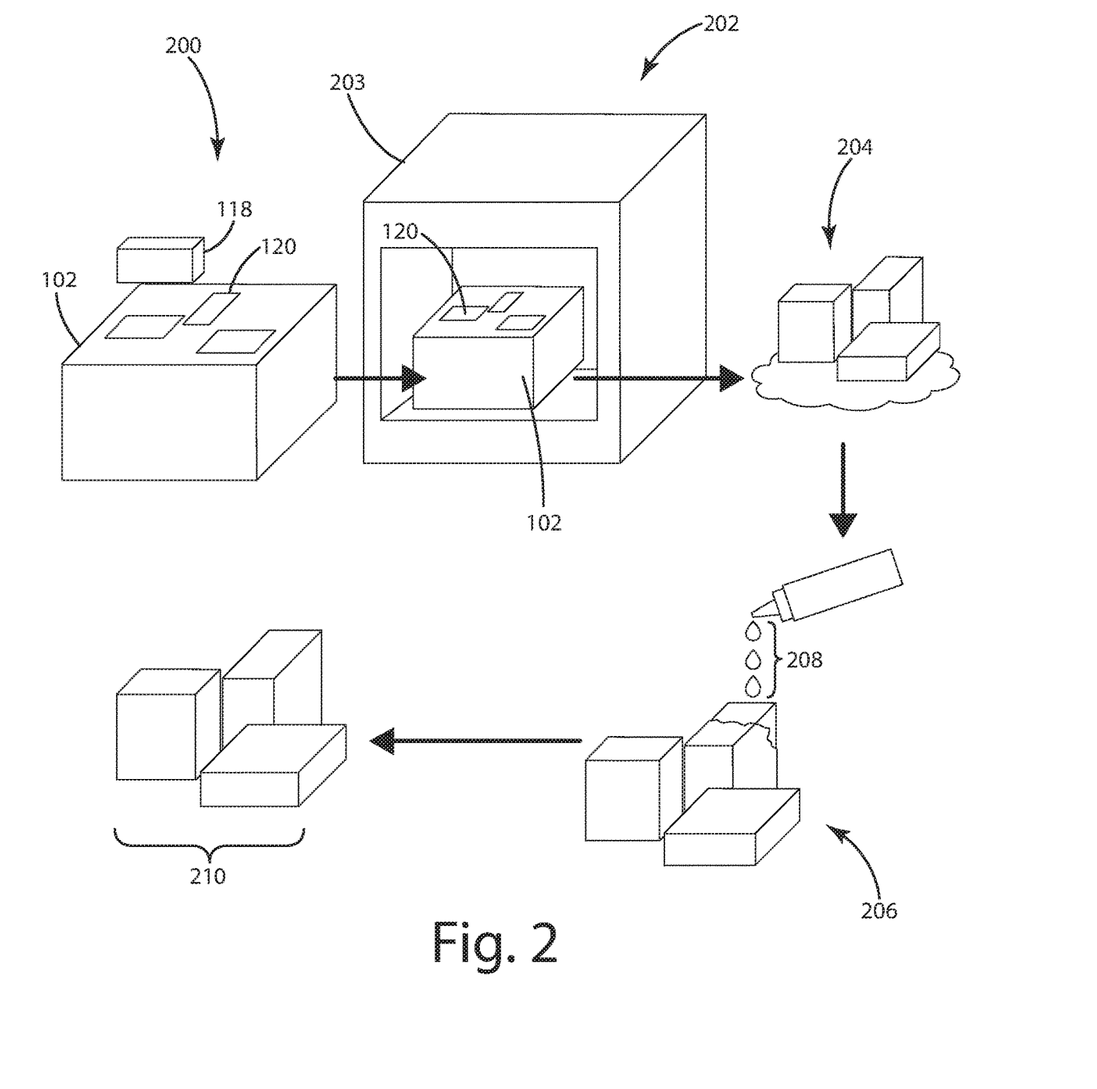
FIG. 2 is a representative flow diagram illustrating one embodiment of a method additive manufacture of components from multiple different materials including neutron absorbing material.
Figure 5:
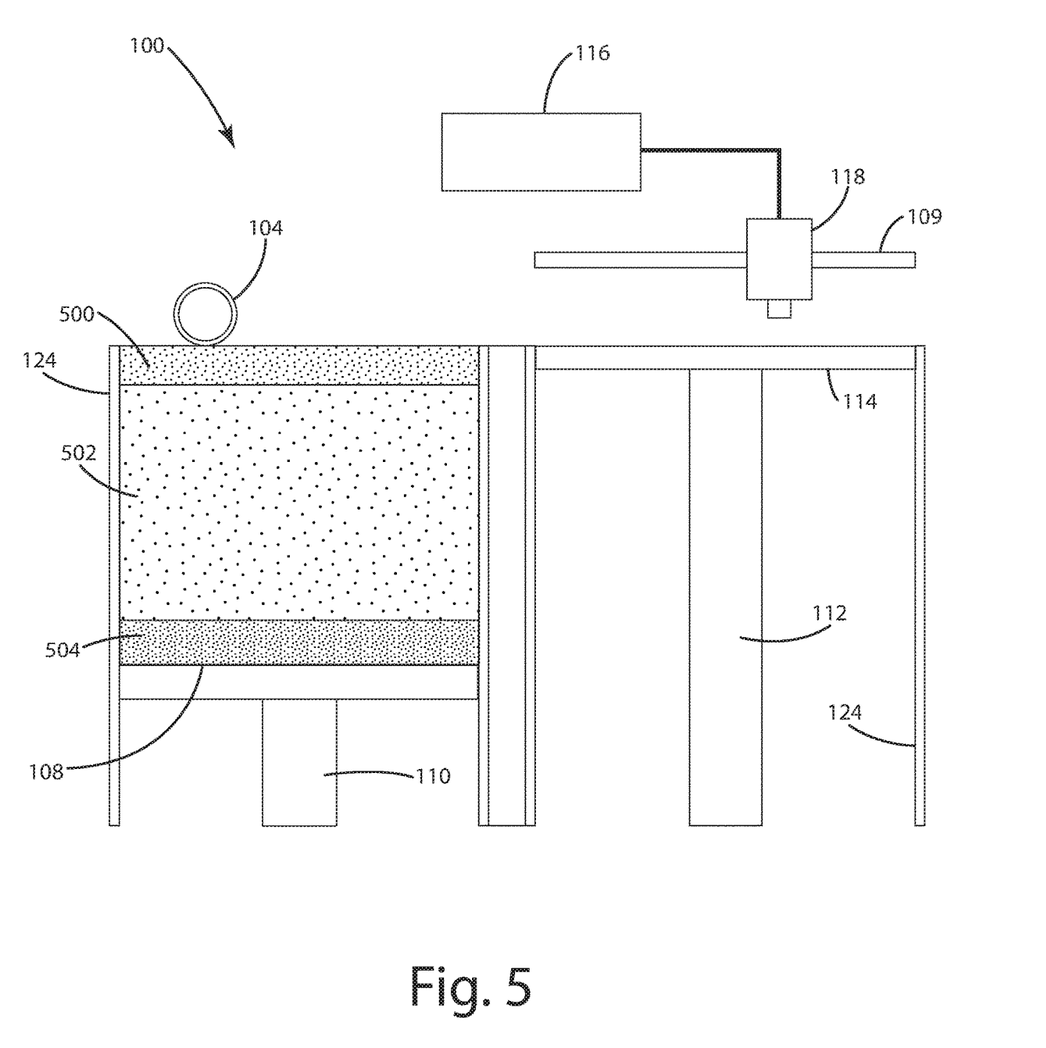
FIG. 5 illustrates a representative sectional view of portions of a binder jet printer with multiple materials, including at least one neutron absorbing material, loaded into the powder feed supply platform for additively manufacturing a composite neutron absorbing component.
Figure 6:
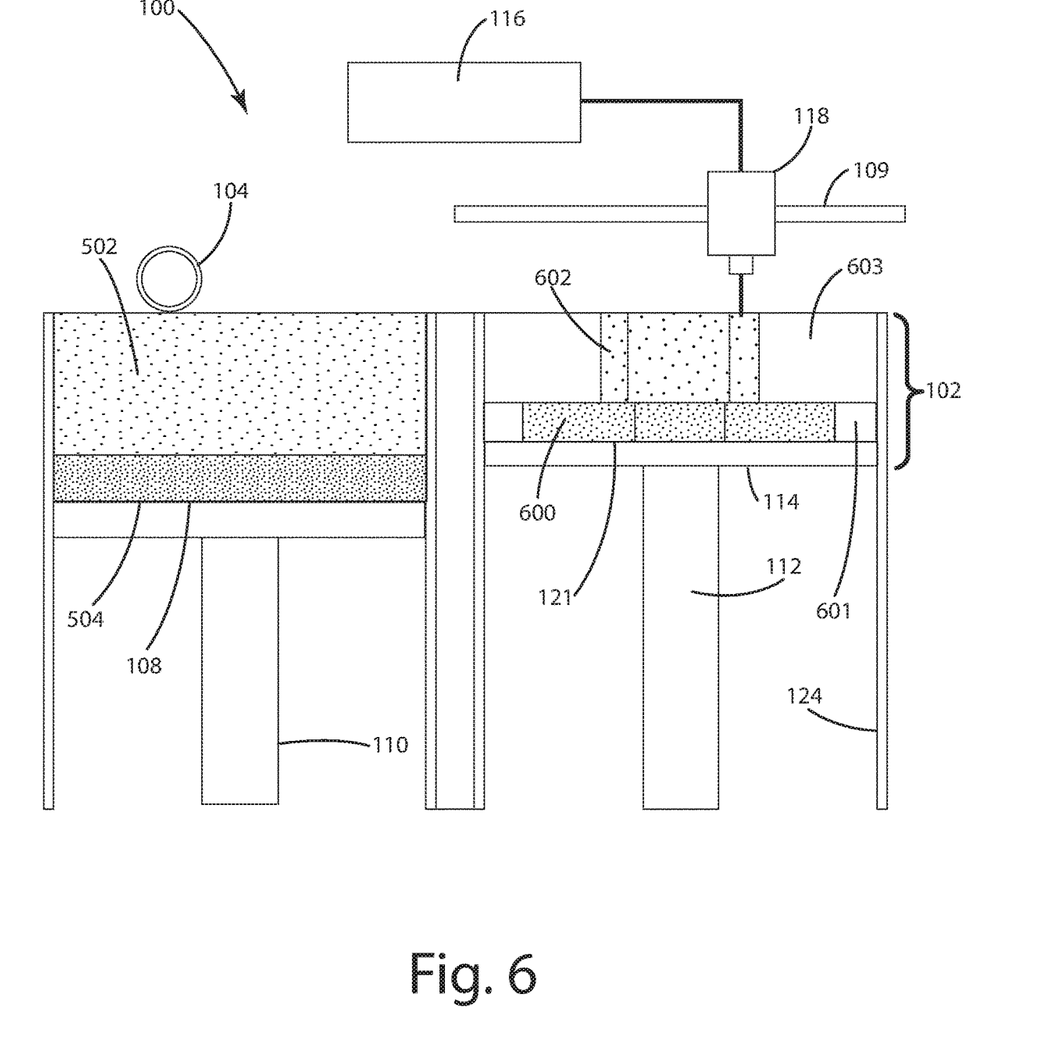
FIG. 6 illustrates a representative sectional view of portions of the binder jet printer of FIG. 5 with a partially printed composite neutron absorbing component.
Figure 7:
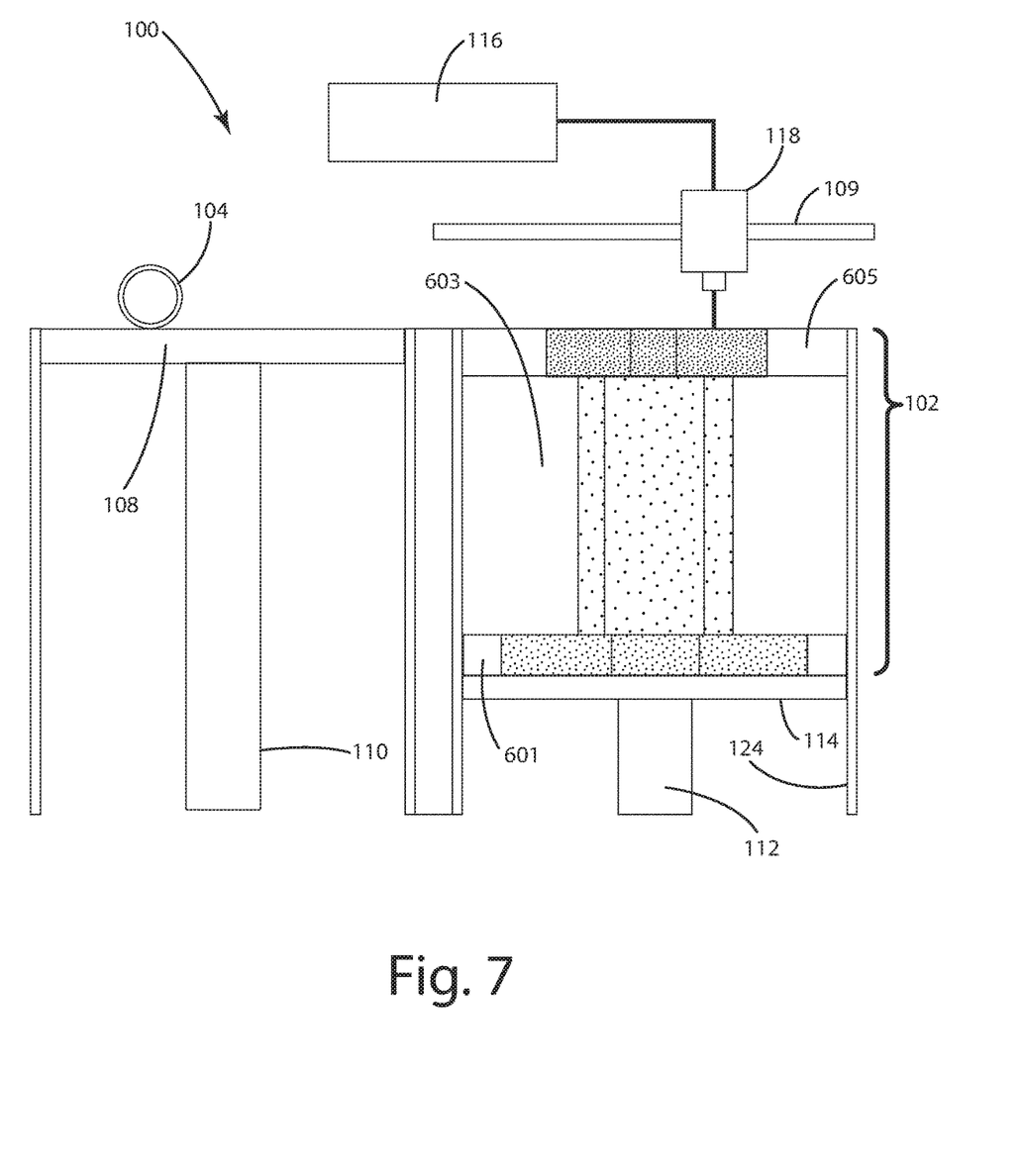
FIG. 7 illustrates a representative sectional view of portions of the binder jet printer of FIG. 5 with a fully printed composite neutron absorbing component prior to removal of the powder bed from the build platform.

FIG. 1 shows a representative perspective view of a binder jet printer 100 capable of producing composite neutron absorbing components. FIG. 2 shows a representative flow diagram 200 illustrating a method of producing composite neutron absorbing components. Additive manufacturing of neutron absorbing components, such as components with complex geometry, is described in U.S. application Ser. No. 16/155,134 to David C. Anderson et al., filed on Oct. 9, 2018, entitled METHOD FOR PRODUCING COLLIMATORS AND OTHER COMPONENTS FROM NEUTRON ABSORBING MATERIALS USING ADDITIVE MANUFACTURING, which was previously incorporated by reference in its entirety. The same additive manufacturing printer equipment can be utilized to additive manufacture neutron absorbing components in connection with the present disclosure. One embodiment of the present disclosure will now be described in connection with sectional views of FIGS. 5-7. Differences between this embodiment of the present disclosure and the incorporated reference are highlighted to aid explanation. FIGS. 5-7 illustrate one embodiment for additively manufacturing a composite neutron absorbing component with two or more different materials. The depicted embodiment involves layering two neutron absorbing powders 500, 504 with a layer of neutron non-transparent powder 502 between. In general, a composite neutron absorbing component additively manufactured according to the present disclosure includes (1) one or more portions formed from neutron absorbing powder layers and one or more portions formed from neutron non-transparent powders, such as illustrated in the neutron absorbing component of FIG. 3-4; or (2) two or more portions formed from different neutron absorbing powder layers, such as shown in FIG. 8.

FIG. 2 depicts an overall representative flow diagram illustrating a method of producing one or more composite neutron absorbing components. Specifically, the first step 200 shown in FIG. 2 of producing a powder bed 102 with a printer head 118 including composite neutron absorbing components 120 will be described in connection with the exemplary and representative binder jet 3D printer shown in FIG. 1 and FIGS. 5-7.

As will be described in more detail in connection with FIGS. 5-7, two or more different types of material, such as, for example, neutron absorbing powder, can be loaded onto a powder feed supply platform 108. In the illustrated embodiment of FIG. 1, three different types of materials (500, 502, 504) are loaded onto the powder feed supply platform 108 to form a supply powder bed 106 (as an example, powder bed 106 can include a first powder material having a first set of neutron absorbing characteristics 504, a neutron non-transparent material 502, and a second powder material having a second set of neutron absorbing characteristics 500). As discussed in connection with alternative embodiments below, the powders can be loaded according to a particular method (for example, they may not all be loaded on the powder feed supply platform on top of one another) to control the bonding between adjacent layers in the transition zones or areas between materials. In the depicted embodiments, the powder feed supply platform 108 is movable by a powder feed supply piston 110 to supply fresh material through an aperture 105 in the printer housing 124 associated with the powder feed supply platform 108. In other embodiments, another dispenser system may be utilized to supply fresh powder during printing. The powder can be transported to a powder bed 102 located on the build platform 114, for example by a leveling roller 104 or other powder transport device. The powder bed 102 in FIG. 1 is empty because the supply powder bed 106 has not yet been transferred from the powder feed supply platform 108 to the build platform 114 as part of the printing process. The leveling roller 104 or other dispensing device can dispense (e.g. spread, transport, deposit) the fresh powder 107 into a thin layer. For example, the roller 104 can roll over the hole in the housing 124 where the powder supply is provided and push the powder into a powder bed and distribute it onto the build platform. Although a roller is depicted in the illustrated embodiment, a variety of different equipment can be utilized to dispense the supply powder 107 onto the build platform. For example, some binder jet printers utilize a rake to dispense the supply powder to the build platform. Supply powder can also be moved to the print bed on the build platform via an overhead hopper system. An exemplary hopper system can include a reservoir toward the top of the machine that gravity feeds into a moving shuttle. The shuttle passes over the print area and, using an oscillating mechanism, dispenses the powder over the print area. Dispensing multiple materials in a controlled manner with this hopper system can be more challenging in some situations because filling, feeding, and dispensing involves increased movement of the powder, which can induce mixing of the powders. However, such a hopper system can also provide multiple routes for dispensing multiple different materials in a single print, including the ability to utilize multiple hoppers or emptying a hopper between each material type dispensed.

The specific thickness of the powder layer can vary depending on the application and can be controlled by positioning the height of the build platform 114. The binder jet printer 100 can selectively deposit binder droplets 122 from one or more of the binder feeders 116 onto the layer using an inkjet print head 118 that results in a pattern of binder on the layer that together, with additional layers of powder and binder, eventually forms one or more composite neutron absorbing components 120. In the illustrated embodiment, the printer head can move along rails 109 in two axes.

After the binder is deposited, the build volume is dropped by actuating the build platform pistons 112 or other repositioning system to reposition the build platform 114 so that fresh powder 107 can be dispensed, and the process can be repeated until the one or more composite neutron absorbing components 120 have been formed in the powder bed 102. Once all the layers are finished and the one or more composite neutron absorbing components 120 are complete in the powder bed 102, the powder bed 102 can be transported to a curing oven for a curing step 202, if applicable.

In the current embodiment, the powder bed 102 including the composite neutron absorbing components 120 are heated to about 200 degrees Celsius to cure the composite neutron absorbing components 120 by driving off or evaporating the solvent from the binder. This curing process increases the strength and binds the components together. In alternative embodiments, the curing temperature may be higher or lower, depending on a variety of factors, for example depending on the particular characteristics of the binder used during the additive manufacturing process and the particular, different materials of the composite component. In some alternative embodiments, the curing oven may be foregone altogether. For example, in some embodiments, after depositing binder on a layer, but before dispensing the next layer of neutron absorbing powder, the solvent in the binder can be evaporated with a lamp installed on the print head or elsewhere in the printer. Further, photo-cured binders may be used, which solidify upon exposure to UV or other wavelengths of light.

Referring to FIG. 2, the resulting bound composite neutron absorbing components can be de-powdered 204. De-powdering is the process of removing the composite neutron absorbing components 120 from the powder bed 102. For example, de-powdering can include repeated vacuuming, brushing, and blowing with compressed air. De-powdering can be done manually at a de-powdering table or automatically/semi-automatically with assistance from a de-powdering unit.

Some embodiments of the binder jet printing processes may include a sintering step. Some neutron absorbing powders, such as Boron Carbide, do not sinter at temperatures that can be easily achieved by typical furnaces. For example, pressureless sintering of composite neutron absorbing components made from boron carbide may be possible at around 2400 degrees Celsius. As an alternative to sintering, some embodiments include an infiltration step to strengthen the composite neutron absorbing component. Some neutron absorbing material, such as Gadolinium Oxide ($Gd_2O_3$) is easier to sinter than Boron Carbide. Accordingly, when using such materials as one of the composite materials of the neutron absorbing component, it may be possible to sinter the component instead of or in addition to infiltrating it with an additive.

The neutron absorbing powder, such as enriched or natural Boron Carbide, can be printed with or without a bonding agent such as a polymer or metal in order to enable post process sintering of the infiltrated product to enhance its mechanical properties. The neutron absorbing powder particles, e.g., Boron Carbide particles, can also be prepared before the printing process by coating them with a bonding agent in order to improve post process sintering or enable sintering at lower temperatures. Other types of neutron absorbing materials can include changes to these processes or additional processes. For example, the methods and articles embodied by the current disclosure can be adapted to utilize other types of neutron absorbing materials such as Gadolinium containing materials such as Gadolinium oxide ($Gd_2O_3$), Cadmium containing materials, such as Cadmium oxide (CdO), or Lithium containing materials, such as Lithium-6 Carbonate ($^6Li_2CO_3$) in order to print composite neutron absorbing components. In some alternative embodiments, both sintering and infiltration steps can be omitted entirely. Other steps may also be adapted depending on the particular types of neutron absorbing materials.

The method can include infiltrating 206 the de-powdered component with an additive 206. For example, ethyl cyanoacrylate adhesive 208 can be used to infiltrate the composite neutron absorbing components to provide additional strength to the components. In the embodiment depicted in FIG. 2, a bottle of ethyl cyanoacrylate is used to manually dispense ethyl cyanoacrylate 208 on to the surface of the composite neutron absorbing components 120. Once the additive is infiltrated into the neutron absorbing components, the process may include curing the neutron absorbing components depending on the properties of the infiltrated additive. For example, ethyl cyanoacrylate cures at room temperature. In the current embodiment, the resultant composite neutron absorbing components 210 are functional once the additive is infiltrated into the neutron absorbing component and cured. That is, in the current embodiment, the composite neutron absorbing component, once infiltrated with cyanoacrylate, has sufficient structure to hold its own shape, be handled, and be functionally useful in its capacity as a neutron absorbing component in neutron scattering equipment, such as a neutron absorbing collimator.

It can be preferable to avoid or limit hydrogen in neutron scattering experiment equipment, such as collimators, because hydrogen is a large incoherent neutron scatterer, which means it increases unwanted neutron radiation background. The resultant composite neutron absorbing components produced by some embodiments have about 40% (by volume) neutron absorbing powders (FIG. 8) or about 40% (by volume) neutron absorbing powders and neutron non-transparent powders (FIGS. 3-4). In both examples, the remaining 60% (by volume) is the infiltrant, such as cyanoacrylate. Cyanoacrylate has some hydrogen, which contributes to the overall hydrogen content of the composite neutron absorbing components, however the total amount of hydrogen in the composite neutron absorbing components is less than 5% by volume, and in some embodiments less than 2% by volume, by calculation. Another exemplary infiltrant is molten aluminum, such as described in U.S. patent application Ser. No. 16/800,012, entitled Additive Manufacturing Process for Producing Aluminum-Boron Carbide Metal Matrix Composites, filed on Feb. 25, 2020, which is hereby incorporated by reference in its entirety.

A variety of different neutron absorbing powders that have different characteristics can be utilized to additively manufacture composite neutron absorbing components. Examples of some of the neutron absorbing powders that can be used in different embodiments of the present disclosure include Boron Carbide ($B_4C$), isotopically enriched Boron Carbide ($^{10}B_4C$), Cadmium or Cadmium containing materials (Cd), Gadolinium (Gd) or Gadolinium containing materials like Gadolinium Oxide ($Gd_2O_3$), Lithium (and lithium containing compounds such as Lithium-6 Carbonate ($^6Li_2CO_3$)), and Titanium Diboride ($TiB_2$) to name a few. The particle size of the neutron absorbing powder can be selected depending on the particular application and based on the particular 3D printing equipment. In one embodiment, where the neutron absorbing powder is Boron Carbide, the starting particle size is about 18 μm.

Composite neutron absorbing materials can be used to manufacture components of devices used in or around neutron beams in order to reduce background. For example, composite materials can be made by mixing neutron absorbing powder, such as Boron Carbonite powder, with other ceramic or metal powders to tailor the material to its application. For example, magnets with neutron absorbing characteristics can be made by mixing the neutron absorbing powder with iron or neodymium powder. While different composite neutron absorbing powders can be utilized in the process to additively manufacture a composite neutron absorbing component, the term "composite" in composite neutron absorbing component does not refer to a component that includes a single type of composite material, such as a particular mix of neutron absorbing powder and neodymium powder. Instead, the term "composite" refers to a component that includes multiple sections or portions made from different materials. While one or more sections of the component may be made from a composite material, the term "composite" in composite neutron absorbing component refers to the inclusion of multiple sections or portions that are each made from different material. That is, a component made from a single material (even a composite material) is not a "composite" neutron absorbing component as referenced in this disclosure because it does not include multiple sections each made from their own material.

Put another way, the resultant additively manufactured composite neutron absorbing component in accordance with embodiments of the present disclosure can be monolithic in construction, but substantially heterogeneous in composition. For example, in some embodiments, the resultant composite neutron absorbing component may include multiple sections of varying compositions bound together by the additive manufacturing process, such as is the case with the neutron absorbing collimators illustrated in FIGS. 3-4 and FIG. 8. For example, the sectional view in FIG. 4 depicts three distinct portions 402, 404, 406 of the neutron collimator that are each additively manufactured from a different material and FIG. 8 depicts a neutron collimator with two distinct portions a body 302 and a tip 304.

A variety of different infiltrants can be used in connection with different embodiments of the additive manufacturing process. The type of infiltrant can be selected depending on various factors, for example the type of neutron absorbing powder and its interaction with the infiltrant, the curing process, the density of the infiltrant, the application characteristics of the infiltrant, and the amount of hydrogen in the infiltrant to name a few potential factors. The infiltrant may be selected to limit the amount of hydrogen in the ultimate neutron absorbing components. For embodiments with multiple different types of material that utilize infiltrants, the same or different types of infiltrants, depending on the material, may be utilized.

A variety of different additive manufacturing, or 3D printers can be utilized to produce components from neutron absorbing powder according to embodiments of the present disclosure. Binder-jet 3D printers are especially well-suited for implementing the various embodiments of the method of additively manufacturing a composite component from neutron absorbing powder. For example, the x1Lab, innovent, and mflex binder jet 3D printers sold by ExOne, can be utilized to binder jet additive manufacture composite neutron absorbing components, such as composite neutron absorbing collimators. In addition, different embodiments can work with other binder jet printers, including open source binder jet printers. The 3D printer may include a control system with one or more controllers for controlling the various moving parts of the printer. For example, the controller may control the neutron absorbing powder supply, along with its transport to the powder bed and dispensing of the powder. Further, the control system may control the positioning of the powder bed and the print head, both its positioning and depositing of binder. In the current embodiment, a commercially available binder available from ExOne® headquartered at 127 Industry Boulevard, North Huntingdon, Pa. 15642, is utilized for depositing on any neutron absorbing powder layers to form the neutron absorbing components. In alternative embodiments, other binders can be utilized. The control system may control the printer to produce a 3D printed component according to a pattern or digital design, such as a 3D drawing of the neutron absorbing component, such as a neutron absorbing collimator.

By manufacturing neutron absorbing collimators using additive manufacturing, the neutron collimator geometry can have complex cross sections which diverge in more than one plane. Square, circular, hexagonal, and other shapes can easily be made with either constant or variable cross sections just as easily as simple shapes. Geometries that are either prohibitively expensive or simply impossible to manufacture by other means are easily achieved with additive manufacturing.

The methods of the current embodiments can be varied in numerous other ways to change or increase desired performance, reduce cost, improve manufacturability, or in general optimize a particular parameter or parameters for a particular application.

A composite neutron absorbing collimator generally refers to a one-piece collimator that includes two or more different portions or sections made from different materials. In some embodiments of the present disclosure the different portions of material are contiguous due to being additively manufactured layer by layer. As mentioned earlier, it should be understood that each material itself can be a composite material. However, the term "composite" in composite neutron absorbing collimator, with respect to this disclosure, refers to two or more materials, which may be composite or pure materials, that are present in different portions or sections of the resultant component. For example, while natural Boron Carbide ($B_4C$) powder can be mixed with other ceramic or metal powders to tailor the material for a particular application, a neutron absorbing component made entirely from that one type of material would not be a composite neutron absorbing collimator. Instead, a composite neutron absorbing component in line with the present disclosure includes two or more different materials, such as, for example, (1) one section made from natural Boron Carbide ($B_4C$) and another section made from enriched Boron Carbide ($^{10}B_4C$); (2) one section made from natural Boron Carbide ($B_4C$) and another section made from steel; (3) one section made from natural Boron Carbide ($B_4C$), one section made from steel, and another section made from enriched Boron Carbide ($^{10}B_4C$); or (4) one section made from a blend of enriched and natural Boron Carbide and another section made from pure enriched Boron Carbide, to list a few examples. This and other details will be further emphasized and described in connection with FIGS. 3-4 showing an exemplary additively manufactured composite neutron absorbing collimator and FIGS. 5-7 showing the additive manufacturing process.

One exemplary embodiment of a process to additively manufacture a composite neutron absorbing component, specifically a composite neutron absorbing collimator, will now be described in detail.

A representative view of a binder jet 3D printer 100 is illustrated in FIG. 5. The powder feed supply platform 108 is vertically movable relative to the printer housing 124 by a powder feed supply piston 110 to supply material through aperture in the printer housing 124 during printing. Through interaction with the roller 104, the top layer of powder material can be transported to the build platform 114 in a thin layer.

The powder feed supply platform 108 can be filled to a desired height with two or more different materials. In the depicted embodiment, three separate materials (material one 500, material two 502, and material three 504) are initially loaded into the powder feed supply platform 108. The different materials 500, 502, 504 are loaded into the powder feed supply platform 108 in layers depending on the application and particular component being printed. In the current embodiment, the composite neutron absorbing collimator of FIGS. 3-4 is being printed. Regardless of the methodology, the loading of the powder material into the supply platform of the binder jet 3D printer can be done manually, automatically, or semi-automatically, for example with the assistance of a powder loading apparatus.

Each material can be referred to as material one, material two, material n, etc., where n refers to the number of materials desired in the final composite 3D printed part. After material n (504 in this case because there are three materials) is added to the powder feed supply, material n−1 (502) is then added to the powder feed supply platform 108 on top of material n (504) to the appropriate level. This process is repeated until n−1=1. FIG. 5 depicts the powder feed supply platform 108 loaded with all three different materials 500, 502, 504. In this embodiment, once the materials are fully loaded onto the supply platform, the binder jet 3D printer can be operated to additively manufacture the composite material part on the build platform 114.

Of note, as the materials 500, 502, 504 are loaded onto the supply platform 108, they may not have precise transitions from one material to another. Further, as the powder materials are rolled from the powder feed supply platform 108 to the build platform 114, the resultant layers of different materials on the build platform may not have precise transitions from one material to another. Instead, there may be transition areas between adjacent layers of materials in which materials blend from one to the other.

In some embodiments, transitions from one material to another, including particular characteristics of the transitions, may be controlled by controlling operation of the printer. For example, in one alternative embodiment, transitions can be monitored by monitoring the print job and pausing the process at the appropriate time. While the binder jet 3D printer is paused, material one 500 can be removed from the powder supply 108 and replaced by material two 502. That process can be repeated until all n materials are used and the part is complete on the build platform 102. One characteristic of this pause and load method is that the layers of material can be input into the powder supply 108 in the opposite sequence compared to when all of the materials are loaded into the powder supply at the outset with a full load method. That is, when all materials are fully loaded at the outset, the initial material loaded into the powder supply 108 (material three 504, in this case) will be the last material deposited onto the build platform 102. Whereas, if each material is loaded and removed one at a time, pausing during the material transition to switch to the new material, then the initial material loaded into the powder supply 108 will be the material deposited initially onto the build platform 102 and the final material loaded into the powder supply 108 will also be the final material deposited onto the build platform 102.

Depending on whether the (1) pause and replace method; or (2) full load method are utilized, it can change the characteristics of the resultant additively manufactured neutron absorbing components. For example, where the powder supply 108 is filled with multiple layers of different materials at the outset, enhanced bonding between adjacent materials can occur. While using the pause and load method, in which the print job is paused and the material in the powder supply is removed and replaced with a different material, it can result in precise, non-blended transitions from one material to another. Depending on the application and desired characteristics of the resultant composite neutron absorbing component, a suitable method can be selected.

Additional ways of controlling transitions and locations of materials can include a binder jet or other additive manufacturing printer with multiple source powder beds with different materials or combinations of materials. The printer control system can use a roller or other device to transfer powders from different source powder beds at different times according to a set of pre-defined instructions or in order to automatically create an appropriate gradient, for example as selected by a printer user interface.

Hybrid methods can also be realized by utilizing a combination or variation of the (1) pause and load; and (2) full load methods. For example, one embodiment includes pausing the print job and removing the current material present in the powder supply, but then replacing that material with a blend of the old material (i.e., the material being replaced) and new material, resuming the print job for an appropriate number of layers, pausing again, removing the blended material and replacing it with just the new material. This process can be repeated for each of the transitions between the different materials to leverage certain advantages of both the full load method as well as the pause and load method. In particular, by pausing and replacing the material at each transition between type of material instead of loading the material into the powder feed supply all at once, better consistency and precision in the material deposited on the build platform can be provided. Further, by purposely blending the two adjacent materials, more significant control can be provided over the transition, which increases consistency and precision, but also provides the ability to allow for soft transitions between sections to the extent it is desirable for the resultant composite component.

There are a wide variety of variations on this hybrid approach that fall within the scope of the present disclosure. The characteristics of the blend can be selected to provide appropriate characteristics. For example, the ratio between the blended materials can be carefully selected to provide suitable characteristics for the transition area. Further, the hybrid approach may include creation of multiple transition zones with different ratios between the blended materials. For example, in one exemplary embodiment, a first transition zone may include a first blend of 75% of material one and 25% of material two, and after a suitable transition zone is printed, any leftover of the first blend can be removed from the supply platform 108 and a second blend of 50% of material one and 50% of material two can be loaded into the powder supply. Following the same process, the second transition zone can be printed, second blend removed, and replaced with a third blend (25% material one, 75% material two) to create a third transition zone. Finally, once the third transition zone is complete, the powder supply can be loaded with material two in isolation and the printing can continue. Using this type of hybrid approach, or a variation thereof, the characteristics of the transition between materials can be carefully controlled, which can provide not only the ability to provide certain characteristics for particular applications, but can also increase the consistency of the properties of the resultant component.

It should also be understood that such hybrid approaches may include larger blends between more than two different materials. For example, three or more different materials may be blended in different ratios with transition zones in-between. For example, in a scenario with three different materials where material one is adjacent to material two and material two is adjacent to material three, a transition from material one to material three may include several transition zones with a gradient between material one, material two, and material three. In one exemplary embodiment, a 50% material one, 40% material two, 10% material three blend may provide a first transition layer between layers of materials one and two in isolation and a 50% material three, 40% material two, and 10% material one blend may provide a second transition layer between the layers of materials two and three in isolation.

FIG. 6 shows a 3D printed composite collimator mid-way through the print process. Specifically, it illustrates a partially printed part 121 within the partially printed powder bed 102. As depicted, all of material one 500 has been transferred from the supply platform 108 to the build platform 114, and the inkjet head 118 has moved over the x-y axis with rails 109 depositing binder 116 on portions of the powder bed 102 between the layers to bind the part together. The powder that has binder deposited 600 will form part of the composite neutron absorbing component, while any powder that does not have binder deposited 601, will not. In addition, in the FIG. 6 view, a portion of material two 502 has also been transferred to the build platform 114 via the roller 104. The printer head 118 is shown depositing binder 116 onto appropriate portions of the powder bed 102 to print the component. Just as with material one, the powder that receives binder 602 will form as part of the composite neutron absorbing component, while any powder 603 that does not have binder deposited, will not.

FIG. 7 illustrates the state of the binder jet printer at the conclusion of the binder jet process with the entire powder bed 102 transferred to the build platform 114 and ready for removal. One or more printed parts 120 are defined within the powder bed 102 by virtue of the liquid binder 116 supplied via the inkjet head 118 using rails 109 according to additive manufacturing instructions. Once the powder bed 102 is complete, the printed parts 120 can be removed as described in connection with FIG. 2 and any post-processing of the composite neutron absorbing parts 120 can be done, if desired, to provide the resultant composite neutron absorbing parts 210. This can include de-powdering the powder 601, 603, 605 that did not receive binder 116 from the print head 118 will be removed from the part.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of additively manufacturing a composite neutron absorbing component with a binder jet 3D printer, the method comprising:
   repeatedly dispensing a first powder, having neutron absorbing characteristics, into layers to form a first portion of a powder bed on a build platform;
   repeatedly and selectively binding the layers of the first powder with binder to produce a first portion of the composite neutron absorbing component in the powder bed on the build platform;
   repeatedly dispensing a second powder, different from the first powder, into layers to form a second portion of a powder bed on a build platform;
   repeatedly and selectively binding the layers of the second powder with binder to produce a second portion of the composite neutron absorbing component in the powder bed on the build platform;
   curing the composite neutron absorbing component; and
   de-powdering the composite neutron absorbing component from the powder bed as a single composite neutron absorbing component with distinct portions made from different materials.

2. The method of claim 1 wherein the composite neutron absorbing component is a neutron absorbing collimator where a tip of the neutron absorbing collimator is made from a different material than a base of the neutron absorbing collimator.

3. The method of claim 1 wherein repeatedly and selectively binding the layers of the first powder with binder includes repeatedly and selectively depositing binder on the layers of the first powder, and wherein repeatedly and selectively binding the layers of the second powder with binder includes repeatedly and selectively depositing binder on the layers of the second powder.

4. The method of claim 1 wherein the first powder is natural Boron Carbide and the second powder is enriched Boron Carbide.

5. The method of claim 1 including repeatedly dispensing a third powder into layers to form a third portion of a powder bed on a build platform; repeatedly and selectively binding the layers of the third powder with binder to produce a third portion of the composite neutron absorbing component in the powder bed on the build platform.

6. The method of claim 5 wherein the first powder and third powder are different neutron absorbing powders and the second powder is a neutron non-transparent powder.

7. The method of claim 1 including dispensing the layers forming the second portion of the powder bed on the build platform on top of the layers forming the first portion of the powder bed on the build platform.

8. The method of claim 1 including loading the first powder onto a powder supply platform, loading the second powder onto the powder supply platform while the first powder is loaded on the powder supply platform thereby forming a transition area between the first powder on the powder supply platform and the second powder on the powder supply platform, wherein the first powder and the second powder blend from one to the other in the transition area.

9. The method of claim 1 including loading the first powder onto a powder supply platform, pausing the binder jet 3D printer in response to the repeated dispensing of the first powder into layers to form the first portion of the powder bed on the build platform, removing the first powder from the powder supply platform while the binder jet 3D printer is paused, loading the second powder onto the powder supply platform while the binder jet 3D printer is paused, resuming the binder jet 3D printer including said repeated dispensing of the second powder into layers to form the second portion of the powder bed on the build platform to provide precise-non-blended transitions from the first powder to the second powder.

10. The method of claim 1 including loading the first powder onto a powder supply platform, pausing the binder jet 3D printer after the first powder is transported from the powder supply platform, removing the first powder from the powder supply platform while the binder jet 3D printer is paused, loading a blend between the first powder and the second powder into the powder supply platform while the binder jet 3D printer is paused, resuming the binder jet 3D printer including dispensing the blend onto the powder bed, pausing the binder jet 3D printer after the blended powder is transported from the powder supply platform, removing the blended powder from the powder supply platform while the binder jet 3D printer is paused, replacing the blended powder with the second powder, and resuming the binder jet 3D printing including dispensing the second powder onto the powder bed to provide a controlled transition from layers of the first powder to layers of the second powder.

11. A method of additively manufacturing a composite neutron absorbing component, the method comprising:
    loading a plurality of different types of powder into a powder feed supply of a binder jet printer, wherein at least one of the plurality of different types of powders is a neutron absorbing powder having neutron absorbing characteristics;
    positioning a build platform of the binder jet printer;
    dispensing a portion of the plurality of different types of powder from the powder feed supply into a layer on a build platform;
    selectively depositing binder with a movable binder jet print head on the layer of powder on the build platform;
    repeating said positioning the build platform of the binder jet printer, said dispensing the powder from the powder feed supply into a layer on the build platform, and said selectively depositing binder with the movable binder jet print head on the layer of powder on the build platform to binder jet print a composite neutron absorbing component in a powder bed on the build platform; and
    de-powdering the composite neutron absorbing component from the powder bed.

12. The method of claim 11 wherein the composite neutron absorbing component is a composite neutron absorbing collimator, wherein a tip of the composite neutron absorbing collimator is additively manufactured from a different material than a base of the composite neutron absorbing collimator.

13. The method of claim 11 wherein the plurality of different types of powder include a first powder and a third powder that are different neutron absorbing powders and a second powder that is a neutron non-transparent powder.

14. The method of claim 11 wherein said loading includes loading the plurality of different types of powder onto the powder feed supply of the binder jet printer in layers, one on top of the next, forming transition areas between adjacent layers on the powder supply platform, wherein the adjacent different types of powder blend from one to the other in the transition areas.

15. The method of claim 11 wherein said loading includes loading the plurality of different types of powder into the powder feed supply one material at a time, pausing the binder jet printer after each type of material is transported to the build platform, removing any remainder material in the powder feed supply and loading a different material into the powder feed supply to be dispensed from the powder feed supply into a layer on the build platform to provide precise-non-blended transitions from one powder layer to the next.

16. The method of claim 11 including loading a first powder into a powder feed supply, printing a plurality of layers with the first powder, pausing the printing, removing any remaining first powder from the powder feed supply while paused, loading a blend between the first powder and the second powder into the powder feed supply while paused, resuming the printing including printing one or more layers with the blended powder, pausing the printing again, removing any remaining blend powder from the powder feed supply while paused, loading the second powder into the powder feed supply while paused, and resuming printing including printing a plurality of layers with the second powder to provide a controlled transition from printing layers of the first powder to layers of the second powder.

17. The method of claim 11 wherein said loading is configured according to a pause and replace method, a full load method, or a hybrid combination thereof.

18. An additively manufactured one-piece composite neutron absorbing component comprising:
    a first contiguous portion of material additively manufactured from a first type of neutron absorbing powder having a first set of neutron absorbing characteristics;
    a second contiguous portion of material, joined to the first contiguous portion of material, additively manufactured from a second, different, material having a second set of neutron absorbing characteristics, different from the first set of neutron absorbing characteristics.

19. The additively manufactured one-piece composite neutron absorbing component of claim 18 where the first contiguous portion and second contiguous portion have size, shape, and position for use as a neutron collimator in a diamond anvil cell, the first contiguous portion forming a neutron collimator tip and the second contiguous portion forming a neutron collimator base.

20. The additively manufactured one-piece composite neutron absorbing component of claim 18 where the first contiguous portion and second contiguous portion constructed for use as a neutron collimator for neutron collimation applications.

21. The additively manufactured one-piece composite neutron absorbing component of claim 18 wherein the first contiguous portion of material is additively manufactured from a first type of neutron absorbing powder having a first set of characteristics and the second contiguous portion is additively manufactured from a second type of neutron absorbing powder having a second set of characteristics, wherein the first and second neutron absorbing powder and their characteristics are different from each other.

22. The additively manufactured one-piece composite neutron absorbing component of claim 18 wherein the first contiguous portion of material is selected to enhance a characteristic of the first portion and wherein the second contiguous portion of material is selected to enhance a characteristic of the second portion, wherein the characteristic of the first portion and the characteristic of the second portion are different characteristics.

23. The additively manufactured one-piece composite neutron absorbing component of claim 22 wherein the characteristic of the first portion and the characteristic of the second portion are selected from the group comprising neutron absorption, cost, toughness, and strength.

24. The additively manufactured one-piece composite neutron absorbing component of claim 18 including a third contiguous portion of material, joined to the first and second contiguous portions of material and wherein the first contiguous portion and second contiguous portion are joined to each other indirectly through the third contiguous portion of material, wherein the third contiguous portion of material is additively manufactured from a third material that is a neutron non-transparent material.

25. The additively manufactured one-piece composite neutron absorbing component of claim 24 wherein the third contiguous portion of material is tube shaped having two ends, the first contiguous portion of material includes a beam defining aperture at one end of the tube, and the second contiguous portion of material includes a beam defining aperture at the other end of the tube, wherein the beam defining aperture of the first contiguous portion of material is larger than the beam defining aperture of the second contiguous portion of material.

26. The additively manufactured one-piece composite neutron absorbing component of claim 24 wherein the first contiguous portion of material is natural Boron Carbide, the second contiguous portion of material is enriched Boron Carbide, and the third contiguous portion of material is steel.

27. The additively manufactured one-piece composite neutron absorbing component of claim 18 including a third contiguous portion of material joined to the first and second contiguous portions of material, wherein the first contiguous portion and second contiguous portion are joined to each other indirectly through the third contiguous portion of material, wherein the third contiguous portion of material is additively manufactured from a blend of the first neutron absorbing powder and the second neutron absorbing powder.

* * * * *